April 12, 1927.  
W. R. ZESINGER  
1,624,303

MAINSPRING TESTER FOR 12 AND 16 SIZE WATCHES

Filed Aug. 30, 1924

Witnesses  
G. W. Hawkins  
H. C. Erler

Inventor  
Wm. R. Zesinger

Patented Apr. 12, 1927.

1,624,303

UNITED STATES PATENT OFFICE.

WILLIAM R. ZESINGER, OF SOUTH BEND, INDIANA, ASSIGNOR TO SOUTH BEND WATCH COMPANY, OF SOUTH BEND, INDIANA.

MAINSPRING TESTER FOR 12 AND 16 SIZE WATCHES.

Application filed August 30, 1924. Serial No. 735,165.

My invention relates to a particular kind of a tester or holder for each individual mainspring, in which each mainspring may be transported or held in storage before they are placed in the mechanical device which they are to actuate.

Prior to my invention, mainsprings were transported and stored in containers somewhat similar to my tester but not embracing the idea of having spring contained under the pressure identical with that which it would have when fully wound in its mechanism.

To this end my invention consists essentially in having the aperture in this tester of such shape and size so that when mainspring is inserted in the tester, the mainspring assumes the same shape and position it would be when fully wound in the mechanism it is intended to actuate.

The object of said improvement by so retaining a mainspring is as a test of quality, for example, if the spring is too hard, it will break in the tester, or if not of sufficient hardness the spring will set when retained in the tester.

It may readily be seen that a spring removed from my tester in which the spring has been retained under the identical strain it would have in its mechanism when fully wound, and is neither set nor broken when removed, would be much more reliable and will assure better performance than a spring not placed in such a tester.

Any shape or design for outside of tester may be used as well as a variation in thickness. I do not lay claim to any design for outside shape. This tester may be made of metal or of any suitable material such as hard fiber, hard rubber, etc. and of varying thickness or outside shape.

The nature of my invention will be better understood when described in connection with the accompanying drawings, in which—

Figure 1:
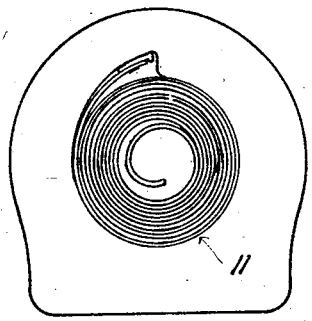
Figure 1, is a plan view of tester with mainspring inserted.
Figure 4:
Figure 4, is a view at edge of tester.
Figure 2:
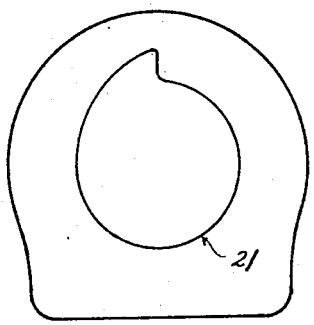
Figure 2, is a plan view of tester without mainspring.
Figure 3:
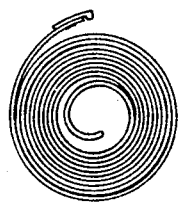
Figure 3, is a mainspring in the position as when fully wound in the mechanism which it is intended to actuate.

In the drawings, 11 in Figure 1 represents the mainspring inserted in tester and in Figure 2, 21 represents the aperture for mainspring.

I claim:

A tester for 12 and 16 size watch mainsprings made of flat metal or other suitable material of which the thickness may vary, having an aperture the shape of a spiral not over .490 inch in diameter and not less than .465 inch in diameter having a notch cut outside of spiral at its largest diameter.

WM. R. ZESINGER.